(12) United States Patent
Edvardsson (10) Patent No.: US 9,506,796 B2
(45) Date of Patent: Nov. 29, 2016

(54) FMCW BASED GUIDED WAVE RADAR LEVEL GAUGE

(71) Applicant: Rosemount Tank Radar AB, Gothenburg (SE)

(72) Inventor: Olov Edvardsson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 236 days.

(21) Appl. No.: 14/511,459

(22) Filed: Oct. 10, 2014

(65) Prior Publication Data

US 2016/0103006 A1     Apr. 14, 2016

(51) Int. Cl.

| | |
|---|---|
| G01F 23/284 | (2006.01) |
| G01S 7/02 | (2006.01) |
| G01S 13/02 | (2006.01) |
| G01S 13/88 | (2006.01) |
| H01Q 1/22 | (2006.01) |
| G01S 7/00 | (2006.01) |
| G01S 13/34 | (2006.01) |

(52) U.S. Cl.
CPC .............. *G01F 23/284* (2013.01); *G01S 7/02* (2013.01); *G01S 13/02* (2013.01); *G01S 13/0209* (2013.01); *G01S 13/88* (2013.01); *H01Q 1/225* (2013.01); *G01S 7/003* (2013.01); *G01S 13/34* (2013.01)

(58) Field of Classification Search
CPC ......................... G01F 23/284; G01F 23/2845
See application file for complete search history.

(56) References Cited

U.S. PATENT DOCUMENTS

| | | | |
|---|---|---|---|
| 6,856,142 B2 | 2/2005 | Schroth et al. | |
| 7,636,059 B1 | 12/2009 | Edvardsson | |
| 8,018,373 B2 * | 9/2011 | Edvardsson | G01F 23/284 342/118 |
| 8,497,799 B2 | 7/2013 | Kleman | |
| 2008/0150789 A1 * | 6/2008 | Jirskog | G01F 23/284 342/124 |
| 2009/0085794 A1 | 4/2009 | Edvardsson et al. | |
| 2012/0169528 A1 | 7/2012 | Edvardsson et al. | |
| 2015/0177163 A1 * | 6/2015 | Edvardsson | G01N 22/00 324/642 |

FOREIGN PATENT DOCUMENTS

| | | |
|---|---|---|
| EP | 2 490 040 A1 | 8/2012 |
| WO | WO 2012/159682 | 11/2012 |

OTHER PUBLICATIONS

Notification of Transmittal of the International Search Report and the Written Opinion of the International Searching Authority from PCT/EP2015/071472, dated Dec. 8, 2015.

* cited by examiner

*Primary Examiner* — Matthew M Barker
(74) *Attorney, Agent, or Firm* — Westman, Champlin & Koehler, P.A.

(57) ABSTRACT

An FMCW type radar level gauge configured to transmit an electromagnetic transmit signal and receive an electromagnetic return signal reflected from the surface, the electromagnetic transmit signal having a bandwidth of at least 1 GHz, a relative bandwidth (max frequency/min frequency) of less than 2.5 and an upper frequency limit less than 4 GHz. The gauge comprises a single conductor probe mechanically suspended in the tank and extending into the product in the tank, and a matching arrangement providing an electrically matched connection between an electrical feed-through and the single conductor probe.
According to the present invention, the relatively expensive still-pipe is replaced with a relatively inexpensive a single conductor acting as a surface wave-guide (SWG).

21 Claims, 6 Drawing Sheets

FMCW BASED GUIDED WAVE RADAR LEVEL GAUGE

FIELD OF THE INVENTION

The present invention relates to an FMCW type radar level gauge for determine a distance to a surface of a product in a tank.

BACKGROUND OF THE INVENTION

Radar level gauging in tanks containing e.g. liquid, gas or granulate products has been used during several decades and a few different technical solutions are in use. For signal generation and signal processing the method called FMCW (frequency modulated continuous wave) has been extensively used especially where the measuring accuracy is a crucial specification point. In most FMCW-system a transmit signal having substantially equal amplitude and a linearly varying frequency is emitted into the tank, and is reflected by the surface. The reflected signal is received and mixed with the emitted signal, to form an intermediate frequency signal, where the intermediate frequency (IF) corresponds to the distance from the transmitter/receiver to the point of reflection (typically the surface of the product in the tank). Other types of frequency modulation instead of a linear sweep are also possible.

FMCW-systems for level gauging typically use frequencies like 6, 10 and 25 GHz and a frequency bandwidth of 1 GHz or (mainly for the 25 GHz-system) up to 2-3 GHz. Systems using around 78 GHz are also known. The internal transmission path from electronics to the antenna is kept clean with low reflections and especially the tank seal may be a bit difficult as it must also stand high pressures, various chemicals etc.

The measuring performance can be characterized in several ways but at least the following four are used on a regular basis:

Accuracy relates to how exact and reliable the measurement is. When the frequency is generated by a frequency synthesizer very high accuracy and long-term stability can be obtained. The accuracy approval is often referred to as "custody transfer approval" and (depending on the country) may be a mandatory legal requirements for certain uses. Typically the required accuracy in such cases is specified to around 1 mm. Note that in a large oil tank 1 mm level difference may correspond to a value of thousands of US dollar.

Distance resolution, or the ability to discriminate between two possible close radar echoes in the tank, is 150-200 mm or slightly more for most radar level gauges.

Updating rate is the time to next measurement. Level gauging in storage tanks is generally not very demanding (the level may change just a few cm per minute or less) and 1 measurement per second is a common acceptable minimum figure. Some applications may require much faster response by the gauging system.

Sensitivity is a measure of how weak echoes can be detected and processed by the signal processing. The maximum two-way path loss is a common way to measure sensitivity, and an FMCW-system should typically not have more than 90-100 dB two-way path loss to perform a measurement. Path loss variation between different cases can be significant.

In principle, the distance resolution capability is basically limited by the radar frequency bandwidth, but for an FMCW-system the limitation is also coupled to the signal processing and there is a trade-off to accuracy with other properties like update rate. An FMCW system needs some filtering operations (windowing of the spectrum) which are typically done digitally. The type and width of the filter window can be optimized for different purposes so the correlation between RF-bandwidth and resolution is weaker than for a pulsed system but still exists, and the bandwidth should therefore normally be at least 1 GHz.

The fact that the distance resolution is normally two orders of dignity larger in terms of distance than the required accuracy (100 mm compared to 1 mm) implies that the radar system, especially an FMCW system, is sensitive for external and internal radar reflections. If the transmission path for example contains two reflections (such as an antenna opening and the not perfectly matched connector to the antenna) there will be a smaller signal which has passed the distance between these two reflexes two extra times. If for instance both reflections have a mismatch of voltage standing wave ratio (VSWR) of 2 (reflection ~−10 dB each) a deviation of ±10 mm may occur at worst case internal distance (within the distance resolution). If the reflections are internal and very stable this may not be a problem (careful calibration can be ensured) but for larger reflections and reflection in a variable tank environment a desired mm-accuracy is obviously in danger if the undesired and initially 10 mm deviation may change from time to time.

In most FMCW-systems a reasonable microwave match of all microwave components (i.e. VSWR<1.2-1.5) has proven to give a feasible practical solution. In very accurate FMCW-systems, however, points of strong mismatch are known to be sources of problem. Reflections from obstacles in the tank give similar influence and are eliminated by using a narrow beam antenna, and FMCW based systems typically use an antenna creating a pencil beam radiation pattern directed perpendicular down towards the surface.

To further increase accuracy, FMCW-based systems are sometimes used with a wave guiding structure in the form of a 50-100 mm pipe of stainless steel extending from the antenna horn through the entire tank. Most typically a 2 inch or 4 inch pipe is used for a 10 GHz system. Such "still-pipes" are a very efficient way to avoid possible disturbing echoes in the tank. Obviously the cost is increased by including a still-pipe, but the pipe enables undisturbed measurement when there are many disturbing objects around the pipe and when the surface sometimes has very low reflection due to a turbulent surface. The pipe, the feeding of it and possibly a valve to disconnect the parts above the tank roof (to enable change of parts) are made with a very good electric match to ensure accuracy.

GENERAL DISCLOSURE OF THE INVENTION

It is an object of the present invention to provide a more cost efficient way to avoid disturbances in the tank in an FMCW-type radar level gauge.

According to a first aspect of the present invention, this and other objects are achieved by an FMCW type radar level gauge for determine a distance to a surface of a product in a tank, the radar level gauge comprising transceiver circuitry configured to transmit an electromagnetic transmit signal and receive an electromagnetic return signal reflected from the surface, the transceiver circuitry including a frequency modulator configured to modulate a frequency of the transmit signal to vary within a frequency range having an upper frequency limit and a lower frequency limit, wherein the upper frequency limit is less than 4 GHz, the lower frequency limit is at least 1 GHz smaller than the upper frequency limit, and a ratio between the upper frequency limit and the lower frequency limit (relative bandwidth) is less than 2.5. The gauge further comprises a mixer configured to mix the transmit signal and the return signal to provide an intermediate frequency signal, and processing circuitry configured to determine the distance based on the intermediate frequency signal. The gauge also comprises a (optionally sealed) electrical feed-through from the transceiver circuitry into the tank, a single conductor probe mechanically suspended in a top of the tank and extending into the product in the tank, the single conductor probe being electrically connected to the transceiver and adapted to guide the electromagnetic transmit signal towards the surface and to guide the electromagnetic return signal to the transceiver circuitry. The electrical feed-through has a first input impedance as seen from the single conductor probe, the single conductor probe has a second input impedance as seen from said electrical feed-through, and the second input impedance is greater than the first input impedance. The gauge further comprises a matching arrangement between the first and second input impedance providing an electrically matched connection between the electrical feed-through and the single conductor probe, a reflection factor of the matched connection being less than −10 dB.

According to a second aspect of the present invention, this and other objects are achieved by a radar level gauging method for determining a distance to a surface of a product in a tank, comprising generating an electromagnetic transmit signal, the electromagnetic transmit signal having a bandwidth of at least 1 GHz, a relative bandwidth of less than 2.5 and an upper frequency limit less than 4 GHz, feeding the electromagnetic transmit signal though an electrical feed through into the tank, and further into a single conductor probe extending into the product in the tank, an electrically matched connection between the electrical feed through and the single conductor probe having a reflection factor less than −10 dB, guiding the electromagnetic transmit signal along the single conductor probe, forming an electromagnetic return signal by allowing the electromagnetic transmit signal to be reflected in the surface, guiding the electromagnetic return signal along the single conductor probe and back through the electrical feed through, receiving the electromagnetic return signal, mixing the electromagnetic transmit signal and the electromagnetic return signal to provide an intermediate frequency signal, and determining the distance based on the intermediate frequency signal.

According to the present invention, the relatively expensive still-pipe is replaced with a relatively inexpensive a single conductor (here referred to as a probe) acting as a surface wave-guide (SWG). Such a single conductor probe has quite different wave-guiding properties than a still pipe and has previously only been used for level gauging using time domain reflectometry (TDR), where baseband pulses (DC pulses) are transmitted along the probe. A combination of an FMCW-type system and a probe has been proposed, but has been found to operate unsatisfactorily, and it has been generally accepted that this type of surface wave guide is unsuitable for FMCW based radar level gauging.

According to the present invention, however, a successful combination of an FMCW-type gauge with a surface wave guide is made possible by a careful selection of operating parameters for the radar level gauge, together with an adequate matching arrangement between the electrical tank feed through and the single conductor probe.

By "matched electrical connection" is here intended an electrical connection with an improved impedance matching compared to a direct transition from the first input impedance to the second input impedance. As will be discussed in detail below, such a direct transition will give rise to disturbing reflections. Such a strong reflection in the transmission path of a FMCW-system is known to be a potential source of problems. This reflection is known to disturb a TDR-system too but generally a FMCW-system is more sensitive for such disturbances. The matching arrangement ensures satisfactory detection performance by reducing such reflections.

The expression "FMCW-type" should be understood to include any system where a frequency modulated transmit signal is mixed with the reflected return signal to form an intermediate frequency signal which in turn is used to determine the distance to a surface in a tank. In a conventional FMCW (frequency modulated continuous wave) system the transmit signal has a constant amplitude and a varying frequency, most often a linearly varying frequency (frequency sweep). In more recent systems, the frequency sweep is realized as a series of discrete frequencies, sometimes referred to as "stepped" FMCW. Also other variations have been proposed, including a transmit signal comprising a series of separated constant-frequency pulses each having different frequency (see e.g. U.S. application Ser. No. 12/981,995).

FMCW-systems have in common that they allow very exact frequency control, which is a significant advantage when ensuring satisfactory impedance matching over a limited bandwidth. A pulsed TDR-system will also have a transmit signal within a certain frequency band but the frequency will not vary over a given range as in a FMCW-system. Rather, the transmit signal will include a frequency spectrum dependent upon the exact pulse shape which will vary from time to time and its limits will not be sharp.

The relatively low upper frequency limit reduces resistive losses (dB per meter along the probe increases roughly like ⅔-power of frequency). Power drain and component cost are also likely to be reduced compared to present FMCW-systems. At least 1 GHz bandwidth ensures satisfactory distance resolution.

When combining any FMCW-based system with a single conductor probe according to the present invention, the matching of the probe with the electrical feed through becomes a critical aspect.

The electrical feed-through typically has relatively low impedance (for example a coaxial feed through will have an impedance of 40-75 ohm if commercial components are used). The impedance of the probe in free space in the tank, on the other hand, is typically more than 250 ohm, or even more than 350 ohm (defined as transported power divided by squared current along the wire). As an example, a non-coated stainless steel wire probe with a diameter of 4-10 mm has an impedance in the range 300-400 ohm in free space for relevant operating frequencies.

Due to this impedance mismatch, conventional TDR-based guided wave radar (GWR) systems typically have a VSWR around 1:7 (50 to 350 ohm) at the feeding point which implies a two-way loss due to reflection of 7 dB. The reflection factor of the impedance transition between the electrical feed through and the probe is often around −2.5 dB which (together with the transmission loss due to the reflection loss) makes the reflection from this impedance transition around 20 dB stronger than a normal echo from an oil surface and even more in the case of liquid gas.

In a pulsed TDR system this mismatch is normally used to create a calibration pulse. If matching has been attempted, it has been problematic due to the large relative bandwidth required by pulsed TDR systems (typically in the order of 10:1). For such frequencies, a stepped impedance matching along the line can be used and still maintain the mechanical strength of the wire. For a transforming ratio of 1:7 (50 to 350 ohm) and a bandwidth of 5-10 (0.1 to 1 GHz or slightly less like 0.2-1 GHz) the length of such a transformer will be over 1 m. As a consequence it must be designed to function also when it is partly under a liquid surface. To a large extent, prior art matching solutions have been focused on solving this specific problem, see e.g. U.S. Pat. No. 7,636,059.

When using an FMCW-system in combination with a single conductor probe according to the present invention, there is no need for such a calibration pulse, and indeed it would affect near zone detection (detection close to the tank roof) negatively. However, as the inventor has realized, an FMCW-type system also allows for use of a much smaller relative bandwidth than a pulsed TDR system. A relative bandwidth less than 2.5 provides an unexpected relaxation of this matching problem, by reducing the length of the matching arrangement nearly ten times but for the same impedance step. Such limited relative bandwidth cannot be achieved in a system using baseband pulses.

According to the present invention, the matching arrangement provides a reflection factor less than −10 dB. In other words, the power of a reflected signal is −10 dB of the incoming signal. This is less than 20% of the reflection by the probe feeding of a conventional GWR system using baseband pulses. Clearly this improves the possibility to measure accurate at levels close to the very top of the tank.

In some embodiments the matching arrangement provides a reflection factor less than −15 dB, or even less than −20 dB. By means of such matching, it can be ensured that a reflection from the electrically matched connection is weaker than a reflection caused by a liquid surface in the tank.

Advantageously, the matching arrangement does not extend into a normal operating region of the tank, i.e. the region of the tank where the surface of the product can be expected to be during normal operating conditions (or expected possible deviations from normal operating conditions). In other words, during normal use the matching arrangement will not extend into the product contained in the tank. This means that the matching provided by the matching arrangement will not be negatively affected by the product during use. Even more preferably, the extension of the matching is so limited that it can be fitted in a nozzle in the roof of the tank. As long as the seal is intact, the product surface will not enter the nozzle more than marginally. As an example, a physical longitudinal extension of the matching arrangement can be less than 20 cm.

In most applications, the probe is mechanically suspended by the electrical feed-through. A typical specification point for a possible mechanical load is 30-40 kN so a center conductor must be made of quite good steel and rather thick (order of 5 mm) to stand that force. Due to these mechanical constraints, the electrical feed through will then have an even lower impedance, typically around 40 ohm or less.

BRIEF DESCRIPTION OF THE DRAWINGS

The present invention will be described in more detail with reference to the appended drawings, showing currently preferred embodiments of the invention.

DETAILED DESCRIPTION OF PREFERRED EMBODIMENTS

Figure 1:
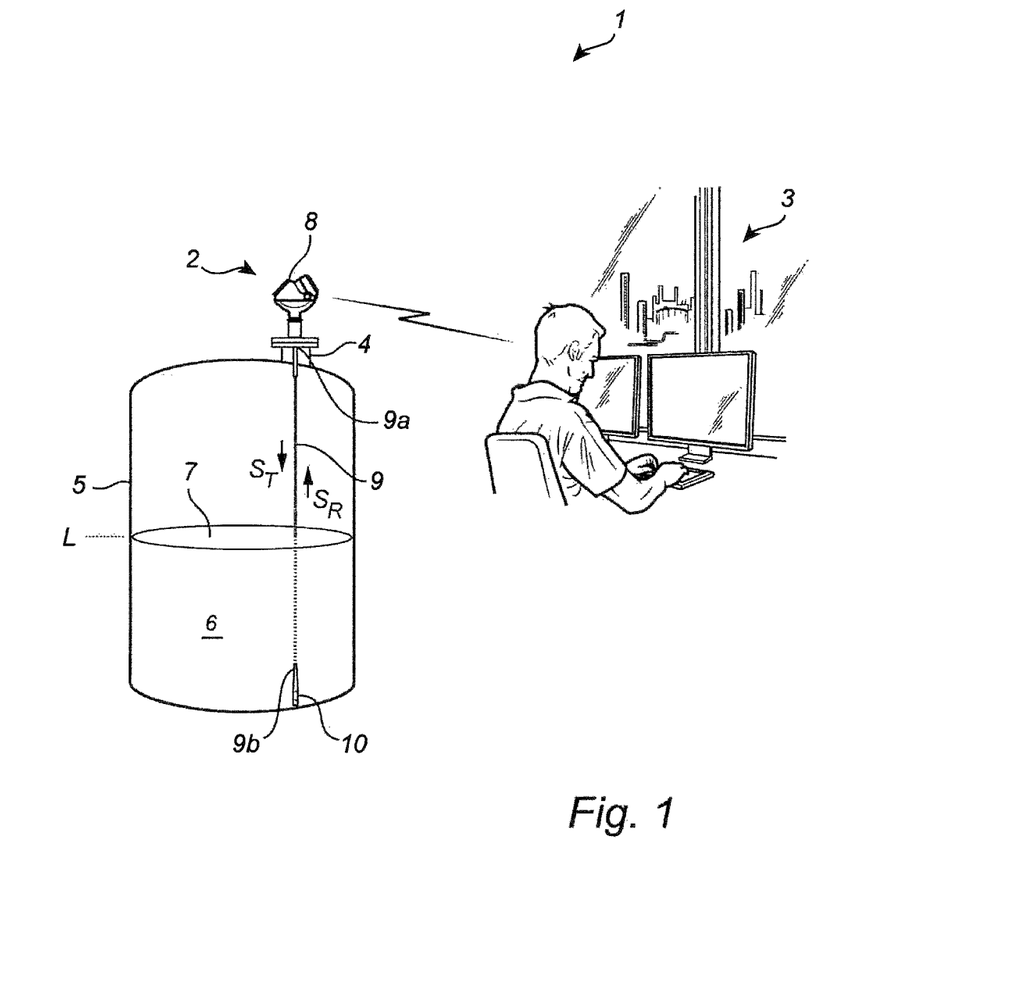
FIG. 1 schematically shows a gauging system according to an embodiment of the present invention.

FIG. 1 schematically shows a level gauging system 1 comprising a radar level gauge 2, and a host system 3 illustrated as a control room. The radar level gauge 2 is here mounted on a tubular mounting structure 4 (often referred to as a "nozzle") extending substantially vertically from the roof of a tank 5. The tank 5 may be any container or vessel capable of containing a product to be measured. Generally the nozzle 4 is an existing part on the tank and initially not intended for the specific type of level gauge. Thus it may have properties not ideal for this purpose. The radar level gauge may of course also be mounted on a tank without any nozzle.

The radar level gauge 2 is installed to measure the filling level of a product 6 contained in the tank 5, by detecting the distance to an upper surface 7 of the product 6. Also a distance to a lower interface, such as an interface between an oil product and water below the oil, may be detected. The radar level gauge 2 comprises a measuring unit 8 and a propagation device in the form of a surface wave guide 9 extending from the measuring unit 8, through the nozzle 4, towards and into the product 6. In the example embodiment in FIG. 1, the surface wave guide is a flexible single conductor probe 9 with a first end 9a connected to the measuring unit 8 and a second end 9b connected to a weight 10, to keep the probe straight and vertical. Alternatively, the probe may be attached to the bottom of the tank.

Figure 2:
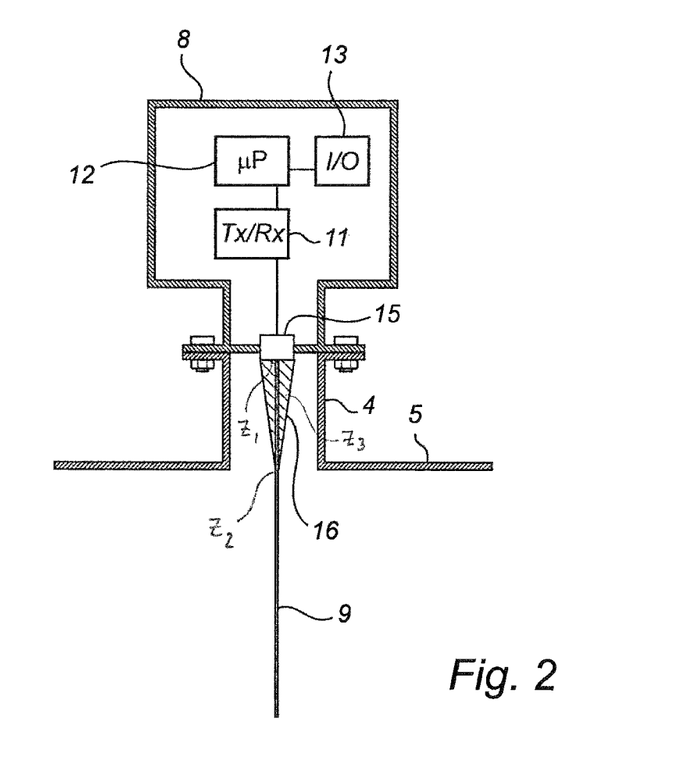
FIG. 2 shows the radar level gauge in FIG. 1 in more detail.

With reference to FIG. 2, the electronics unit 8 comprises a transmitter 11 electrically connected to the probe 9, and processing circuitry 12 electrically connected to the transceiver 11. The "transceiver" may be one functional unit capable of transmitting and receiving electromagnetic signals, or may be a system comprising separate transmitter and receiver units. The elements of the transceiver 11 are typically implemented in hardware, and form part of an integrated unit normally referred to as a microwave unit. The processing circuitry may include a combination of analogue processing realized in hardware, and digital processing realized embodied by software modules executed by an embedded processor. The invention is not restricted to the particular realization, and any implementation found suitable to realize the herein described functionality may be contemplated.

The transceiver 11 is configured to generate and transmit electromagnetic transmit signals $S_T$ which are guided by the probe 9 towards the surface 7 of the product 6. Electromagnetic return signals $S_R$ are caused by a reflection in the surface 7, and are returned along the probe 9 to be received by the transceiver 11.

The processing circuitry 12 is configured to determine the distance between a reference position (such as the tank ceiling) and the surface 7 by analyzing the transmit signal $S_T$ and the return signal $S_R$. From this distance, the filling level L can be deduced. It should be noted that, although a tank 5 containing a single product 6 is discussed herein, the distance to any material interface along the probe 9 can be measured in a similar manner.

The measuring unit 8 furthermore comprises a communication interface 13 connected to the processing circuitry 12 and configured to allow communication with the host system 3. In the example embodiment of FIGS. 1 and 2, the communication between the radar level gauge 2 and the host system 3 is indicated as being wireless communication. Moreover, although not shown in FIG. 2, the radar level gauge system 1 is typically connectable to an external power source, or may include an internal power source such as a battery. The internal power source may be solar powered.

Instead of wireless communication, communication may, for example, take place over an analog and/or digital wire-based communication channel. For instance, the communication channel may be a two-wire 4-20 mA loop and the filling level may be communicated by providing a certain current corresponding to the filling level on the two-wire 4-20 mA loop. Digital data may also be sent across such a 4-20 mA loop, using the HART protocol. Furthermore, pure digital communication protocols such as Modbus, Profibus or Foundation Fieldbus may be used. In case of wired communication, the same wires may also be used to power the gauge.

Again with reference to FIG. 2, the transceiver 11 is connected to the probe 9 via tank feed through structure 15 providing a sealed electrical feed through in the roof of the tank. The sealing is usually an air tight pressure seal, but this is not necessary. In some cases, the sealing is just to prevent leakage. The electrical feed-through 21 has a first input impedance $Z_1$ as seen from the probe 9, while the probe 9 has a second input impedance $Z_2$ as seen from said electrical feed-through. As mentioned above, and as will be explained further below, as a consequence of mechanical and material constraints the difference between the first and second input impedances will be large enough to cause disturbing reflections. For this reason, an impedance matching arrangement 16 is connected between the electrical feed through 21 and the probe 9, to ensure a sufficiently good matching between the first and second input impedance in order to reduce such disturbing reflections. The matching arrangement may exhibit at least one intermediate impedance $Z_3$, smaller than the first input impedance and greater than the second input impedance.

The probe 9 needs to be securely fixed in the top of the tank, and typically it is suspended by the roof of the tank or by the tank feed through structure 15. It needs to withstand rather strong forces, and a typical specification requirement may be 30 kN or even 40 kN. Obviously these strong mechanical forces limits the range of possible realizations of the matching arrangement 16.

The single conductor probe 9 can be formed by a single integral conductor which may or may not be covered by a dielectric coating (a so called Goubau line). In many applications, however, the probe is a stainless steel wire having a plurality of metal threads twined together.

The choice of probe has an impact on the choice of operating frequencies. In the case of a 4 mm stainless steel wire, the table below provides some calculated data (at 1 GHz the calculation is based on 0.14 ohm per square and that is 15% or higher than worst data for stainless steel found it in various sources):

| Frequency GHz | Impedance ohm | 2-way loss per m | Diameter for 95% |
|---|---|---|---|
| 1 | 357 | 0.27 dB | 1.6 m |
| 2 | 326 | 0.42 dB | 1 m |
| 4 | 294 | 0.66 dB | 0.6 m |
| 10 | 249 | 1.23 dB | 0.32 m |
| 25 | 203 | 2.38 dB | 0.18 m |

In the table, "impedance" is defined as transported power divided by squared current and "diameter" applies to the cylinder around the probe through which 95% of the power is transported. A reasonable minimum requirement is that the gauge is operational up to 40 m, and it can be seen that 4 GHz will then result in a 0.66 dB×40=26 dB two-way attenuation. Higher frequencies than 4 GHz should thus probably not be used. The field diameter is arbitrary chosen as 95% of the power within the stated diameter. If a better conductor than stainless steel should be used, the field diameter and impedance will increase and the same is the case for a lower frequency.

In free space inside the tank a stainless steel wire probe has an impedance several times greater than the process seal 21, and a typical value may be 350 ohm. The electrical feed-though 21, on the other hand, will have a significantly lower impendence. For example a plastic-filled coaxial line with 6 mm exterior diameter (of the dielectric) and 1-2 mm inner diameter will have 40-70 ohm impedance. With inner diameter of 0.5 mm the impedance of the line approaches 100 ohm but any transmission line suitable to pass a rugged seal will necessarily have a rather low impedance probably below 100 ohm.

The connection of the probe 9 to the process seal 21 therefore typically creates an impedance transition between a low impedance of the electrical feed-through 21 and the high impedance of the single conductor probe 9 in free space (i.e. the free space impedance of the probe).

As mentioned above, this impedance transition partly reflects the electromagnetic transmit signal $S_T$, giving rise to an echo signal which may be substantially stronger than the surface echo signal resulting from reflection of the transmitted signal at the surface of the product contained in the tank. The reflection caused by the impedance transition may thus interfere with the surface reflection. As a typical example, the reflection factor of this echo is between −2 and −3 dB.

In a case where the radar level gauge 2 is mounted on a nozzle 4, as indicated in FIG. 2, the nozzle 4 will cause two impedance transitions and thus two disturbing echoes. The echo in the upper end of the nozzle will be decreased (and more decreased if the nozzle is narrow) but there will also be an echo at the lower end where the "free space" in the tank begins. The latter echo will increase when the nozzle is narrower. The stronger of these two echoes will (as seen over various nozzles and wires) typically be between −4 and −7 dB.

The matching arrangement 16 according to the present invention is connected between the electrical feed through 21 and the probe 9, and is arranged to remove or at least reduce substantially any impedance transition, so as to make any reflection caused by the transition(s) weaker. As an example, the metched electrical connection may result in a reflection factor less than −10 dB, i.e. a reflection is −10 dB weaker than the incoming signal. Preferably the reflection factor is less than −12 dB, less than −15 dB, or even more preferably −20 dB. In general, it is desirable to reduce the impedance transition to such an extent that a reflection caused by the transition is weaker than a reflection caused by a products yielding relatively weak echo signals, such as liquid natural gas (LNG), liquid petroleum gas (LPG), oil-based products, and solids such as plastic pellets or grain. In these cases, the surface echo can be expected to be around −18 dB weaker than the incoming signal.

It the context of this disclosure, the matching arrangement 16 relates to any elements provided between the electrical feed through 21 and the probe 9 in free space inside the tank (or nozzle). In some embodiments, as will be discussed below, the matching arrangement 16 may be a device arranged around the probe 9. The upper part of the probe 9 will then have a gradually increasing impedance until the "free space impedance" of the single conductor probe inside the tank. It is also possible to envisage the matching arrangement as a set of components arranged in close proximity to the electrical feed through, at the upper end of the probe.

Figure 3:
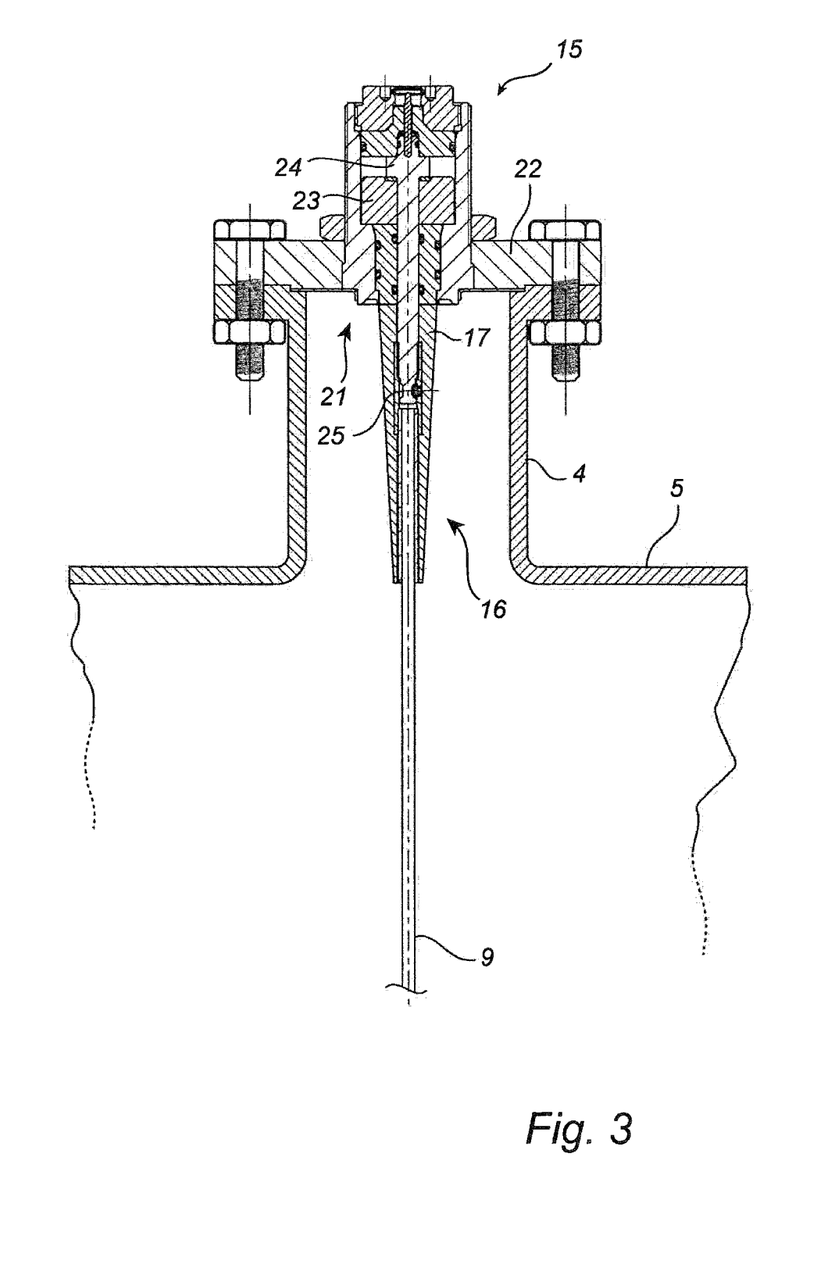
FIG. 3 shows an example of a tank feed through structure.

An example of a feed through structure 15 and probe suspension is shown in FIG. 3. The electrical feed through 21 here comprises a sealing element in the form of a dielectric annular sleeve 23 arranged around a central conductor 24, to form a sealed electrical connection through the tank wall 22. The electrical feed through 21 here also serves as suspension for the probe 9. For this purpose, the conductor 24 of the electrical feed through 21 has a probe connection terminal 25 where the probe 9 may be attached.

As mentioned, the force exerted by the probe on this terminal 25, and thus on the electrical feed through 21, is significant. Therefore, the dimensions of the central conductor 24 and the annular sleeve 23 need to be rather robust, and as an example the conductor 24 may have a diameter of 4-8 mm. As a result, the electrical feed through 21 in effect is a coaxial connection with relatively low impedance, typically in the order of 40-50 ohm.

Various matching arrangement designs, including both dielectric and metallic, are known in the art, and discussed in e.g. U.S. Pat. No. 7,636,659, hereby incorporated by reference. In the example in FIG. 3, the matching arrangement includes a hollow, conically shaped dielectric sleeve 17 provided coaxially around the probe 9.

In the illustrated example, the impedance matching arrangement does not extend below the bottom opening of the nozzle 4. To facilitate insertion into the tank 5, the maximum axial dimension of the impedance matching arrangement is preferably smaller than the axial dimension of the through hole provided in the tank 5.

Figure 4:
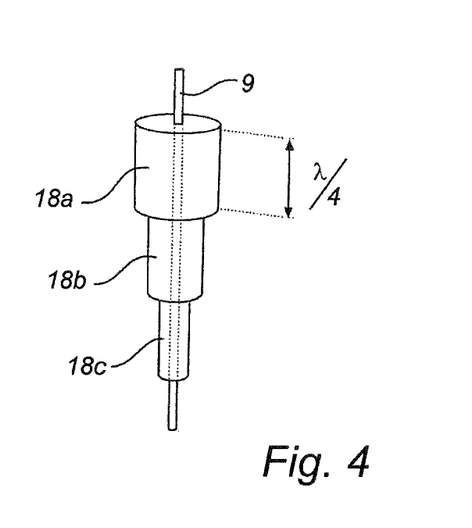
FIG. 4 shows a further example of a matching arrangement.

FIG. 4 illustrates a matching arrangement with several steps, sometimes referred to as a Tchebyscheff design. The transformer here comprises three cylindrical segments 18a-c with decreasing diameter towards the free end of the single conductor probe 9. Each cylindrical segment 18a-d may advantageously have a length of about a quarter of a wavelength of the center frequency of the signal to be transmitted by the transceiver 11. The continuous transition in FIGS. 2 and 3 is shown conical but as known in the art various non-linear transitions may provide better performance.

The stepped transformer is generally the shortest design for a required maximum mismatch but a continuous change is better in case the oil level partly covers the transformer. In any case the reflection factor from the matching arrangement is advantageously designed to be well below the reflection from an oil surface which is around −15 dB. As an example, the reflection factor may be between −20 dB and −24 dB.

The conditions for making such a short matching arrangement will be discussed in connection to FIG. 8.

Figure 5:
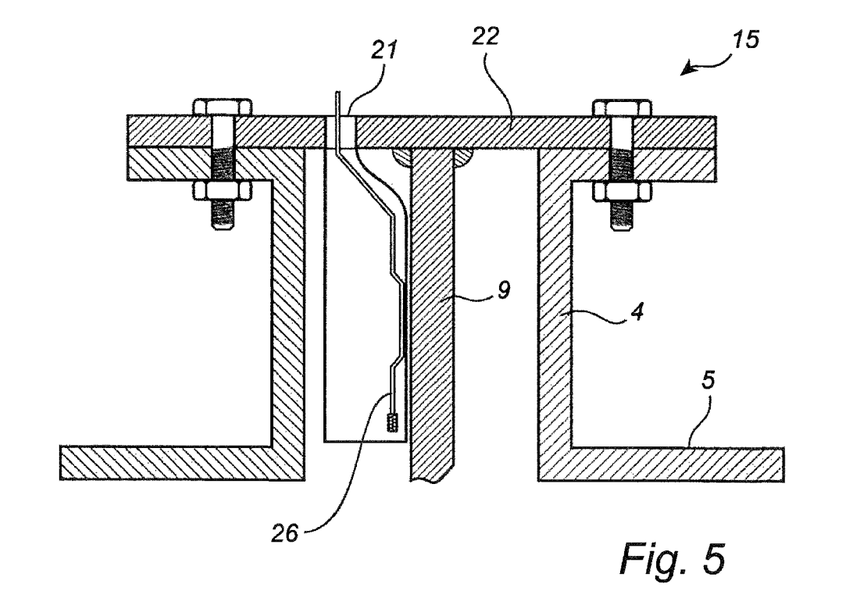
FIG. 5 shows a second example of a tank feed through structure.

Another embodiment of a feed through structure 15 is illustrated in FIG. 5. Here, the probe 9 is mechanically suspended by the roof of the tank, and not in the electrical feed through 21. A signal coupling arrangement 26 is provided to enable the transmit signal and return signal to be coupled into the probe 9 via a galvanically separated coupling. Even thought the electrical feed through 21 is here not exposed to strong forces, it will still typically have a much lower impedance than the probe, most likely far less than 100 ohm. The coupling arrangement 26 will therefore need to include an impedance matching arrangement, in order to reduce the mismatched as discussed above. In the illustrated example, the coupling arrangement 26 includes three $\lambda/4$ segments, where the center segment is arranged at a smaller distance from the probe 9. The details of the coupling arrangement are not the subject of the present invention, but examples of suitable arrangements are disclosed in US 2009/0085794, hereby incorporated by reference.

Figure 6:
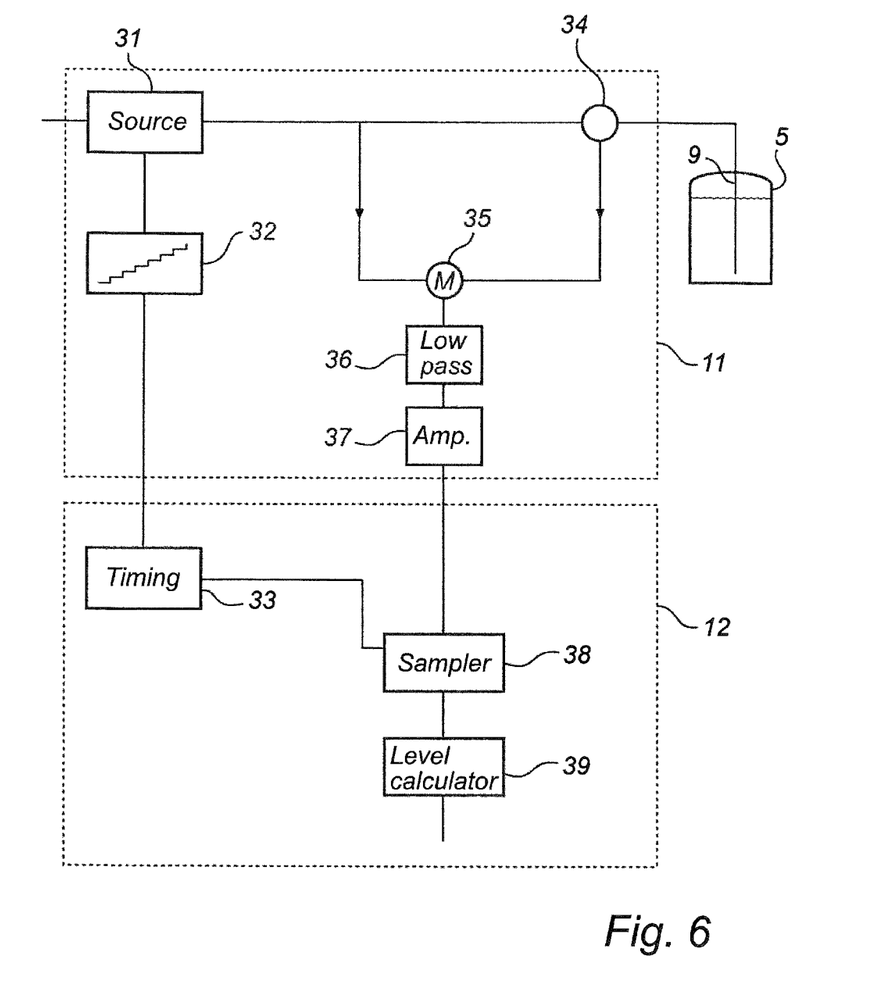
FIG. 6 shows a block diagram of the transceiver and processing circuitry in FIG. 2.

Referring now to FIG. 6, there is shown a more detailed block diagram of the transceiver 11 and processing circuitry 12 in FIG. 2, in the case of an FMCW system where the frequency "sweep" has a piecewise constant frequency (a stepped or staggered frequency sweep). It should be understood that the present invention is not limited to such "stepped" systems, and on the contrary may be used also in systems with continuously modulated transmit signals. Also many other alternatives of frequency modulated signals may be used as a transmit signal in order to determine the distance to the surface by homodyne mixing.

The transceiver 11 here includes a microwave source 31, such as a crystal controlled oscillator, driven by a step generator 32, in turn controlled by timing circuitry 33 forming part of the processing circuitry 12. The microwave source 31 is connected to the probe 9 via a power divider 34. The power divider 34 is arranged to connect a return signal from the antenna to a mixer 35, which is also connected to receive the signal from the microwave source 31. The mixer output is connected to a low pass filter 36 and an amplifier 37.

In some versions of FMCW systems, the return signal is mixed with a delayed version of the transmit signal. Such processing has certain advantages, but also a cost in terms of additional components.

The processing circuitry 12 here includes, in addition to the timing circuitry 33 mentioned above, a sampler 38 adapted to receive and sample the signal. The sampler may comprise a sample-and-hold circuit in combination with an ND-converter, or be realized as a sigma-delta converter. The sampler 38 is controlled by the timing circuitry to be synchronized with the measurement signal. Finally, the processing circuitry includes a level calculator block 39 connected to the sampler 38.

The transmit signal here has a bandwidth greater than one GHz, to provide sufficient resolution, a relative bandwidth (max frequency/min frequency) less than 2.5 to enable effective matching, and an upper frequency limit less than four GHz to avoid excessive attenuation along the single conductor probe. As possible choices for a suitable frequency range are 1-2 GHz, 2-4 GHz or 1.2-3 GHz.

It is noted that the relative band width will be greater compared to existing FMCW systems that typically only have 0.15-0.20 relative bandwidth. For example, a center frequency of 10 GHz and a bandwidth of 2 GHz. For this reason, the existing circuitry used for conventional FMCW systems would need to be reengineered in more ways than decreasing the frequency.

Figure 7:
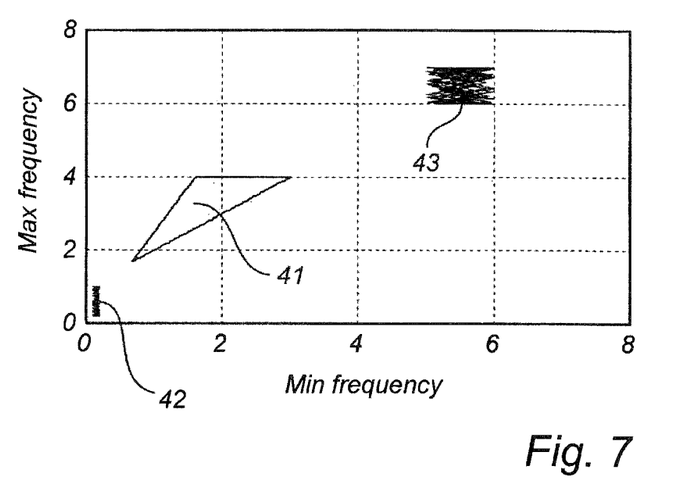
FIG. 7 shows a diagram of frequencies suitable for the present invention.

FIG. 7 illustrates the resulting set of possible combinations of upper and lower frequency limits in the area with reference 41. For comparison, area 42 represents frequencies in a typical baseband pulse TDR system (approximate range 0.1-1 GHZ), and area 43 represents frequencies in a conventional 6 GHz FMCW system (center frequency around 6 GHz, bandwidth 1-1.5 GHz).

During operation, the timing circuitry 33 controls the microwave source 31 to output a transmit signal, here in the form of a stepped frequency sweep. The transmit signal is normally stepped from a lower frequency to a higher frequency in suitable steps. Alternatively, the transmit signal may instead be stepped from a higher to a lower frequency, or the frequency steps may even be taken in any order.

The number of steps N the sweep may be around 1000 for a desired range of 30 m. The size of each frequency step ($\Delta f$) will thus typically be in the order of MHz. For a power limited application the duration of the sweep is limited, and is typically in the order of 0-100 ms. As an example, the duration of the sweep may be around 30 ms, and with 1000 frequency steps (N=1000), this results in a duration for each step in the order to 30 µs, or an update rate of around 30 kHz. Other sweep durations are of course also possible.

The measurement signal from the microwave source is emitted into the tank 5 and allowed to propagate along the probe 9, and the echo signal is returned via the power divider 34 to the mixer 35 where it is mixed with the transmit signal. The mixed signal, referred to as an IF-signal, is filtered by the filter 36 and amplified by amplifier 37 before being supplied to the processing circuitry 12. The IF signal is a piecewise constant oscillating signal, with a frequency proportional to the distance to the reflecting surface and the piecewise constant length is the same length as the measurement signals step length. A typical frequency is in the order of kHz, e.g. less than 100 kHz, and typically less than 15 kHz.

The amplified IF-signal is received by the processing circuitry 12, where it is sampled and A/D-converted by the sampler 38. The sampling frequency of the A/D-converter is advantageously sufficiently close to the update rate of the measurement signal, in order to sample each step of the measurement signal once and only once.

The sample vector resulting from the sampling is supplied to the level calculator block 39, which determines the frequency of the IF-signal based on the sample vector, and then determines the distance to the reflecting surface (and subsequently the filling level of the product in the tank) based on the IF-signal frequency.

Figure 8:
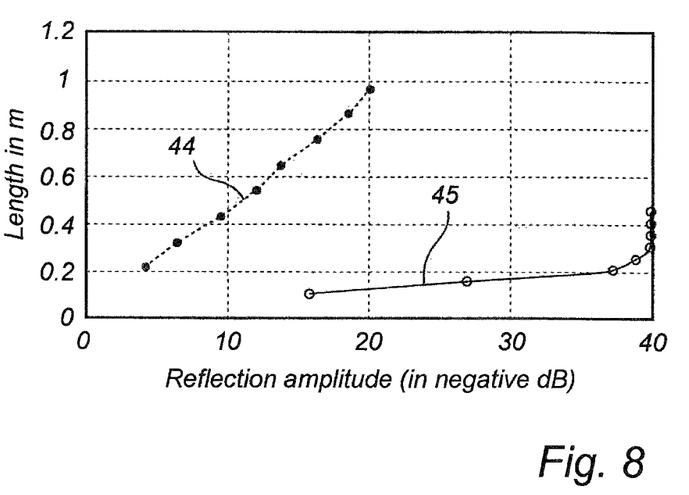
FIG. 8 shows a diagram of the length of a stepped impedance transformer as a function of maximum mismatch.

In order to illustrate the remarkable improvement in space requirements when using a high impedance probe with a modified FMCW system, as proposed by the present invention, reference is made to FIG. 8. The diagram in FIG. 8 shows the length of a Tchebyscheff transformer as a function of maximum mismatch in (negative) dB. The first curve 44 relates to a typical TDR system with a pass-band of 200-1200 MHz (one ns DC pulses and at least 6:1 relative bandwidth). Each section of the transformer is indicated by a point so the transformer length varies between 2 sections and 9 sections each in this case being 107 mm long (equals quarter of a wavelength at the center frequency of 200-1200 MHz). As is clear in the diagram a transformer length around one meter or more is required for fair mismatch function, i.e. a reflection factor below an expected echo from the liquid which may be between −14 dB and −18 dB.

The second curve 45 relates to a FMCW-type system according to an embodiment of the present invention, with a frequency range of 1-2 GHz and for transformers with 2, 3, 4 etc. sections which each are 50 mm due to the higher frequency. For the FMCW-type system already three sections (see FIG. 4) will give a reflection=10 dB below the oil echo and the corresponding length (3×50 mm=150 mm in total) will be above the liquid surface under normal operating conditions in most applications. It should also be stressed that the frequencies in the FMCW-transmitter typically will be kept within its limits (1-2 GHz in this case) under all conditions so the behavior of the filter transmission just outside of the pass-band will not hurt the function. For both curves 44 and 45 the same impedance step (50 to 350 ohm) is assumed, but the practical difference in the final design are certainly significant. The length of the FMCW impedance transition will allow it to pass an important practical limit as the existing mounting nozzle generally is longer than the stated maximum length of the impedance transformer (150-200 mm).

The person skilled in the art realizes that the present invention by no means is limited to the preferred embodiments described above. On the contrary, many modifications and variations are possible within the scope of the appended claims. For example, the single conductor probe is here disclosed as made of a non-coated stainless steel wire. It should be noted that this by no means limits the scope of the present invention, which is equally applicable to single conductor probes made of other materials and with various coatings, rigid probes made of a metal rod, and probes with different geometry and cross-section.

What is claimed is:

1. An FMCW type radar level gauge for determining a distance to a surface of a product in a tank, said radar level gauge comprising:
    transceiver circuitry configured to transmit an electromagnetic transmit signal and receive an electromagnetic return signal reflected from said surface,
    said transceiver circuitry including a frequency modulator configured to modulate a frequency of said transmit signal to vary within a frequency range having an upper frequency limit and a lower frequency limit,
    wherein said upper frequency limit is less than 4 GHz, said lower frequency limit is at least 1 GHz smaller than said upper frequency limit, and a ratio between said upper frequency limit and said lower frequency limit (relative bandwidth) is less than 2.5,
    a mixer configured to mix said electromagnetic transmit signal and said electromagnetic return signal to provide an intermediate frequency signal,
    processing circuitry configured to determine said distance based on said intermediate frequency signal,
    a sealed electrical feed-through from said transceiver circuitry into said tank,
    a single conductor probe mechanically suspended in said tank and extending into the product in the tank, said single conductor probe being electrically connected to said transceiver and being adapted to guide said electromagnetic transmit signal towards said surface and to guide said electromagnetic return signal to said transceiver circuitry,
    said electrical feed-through having a first input impedance as seen from the single conductor probe, said single conductor probe having a second input impedance as seen from said electrical feed-through, said second input impedance being greater than said first input impedance, and
    a matching arrangement between said first and second input impedance, said matching arrangement providing an electrically matched connection between said electrical feed-through and said single conductor probe.

2. The radar level gauge according to claim 1, wherein said matching arrangement exhibits at least one intermediate impedance, smaller than said first input impedance and greater than said second input impedance.

3. The radar level gauge according to claim 1, wherein said matching arrangement does not extend into a normal operating region of said tank.

4. The radar level gauge according to claim 1, wherein a physical longitudinal extension of said matching arrangement is less than 20 cm.

5. The radar level gauge according to claim 1, wherein said electrical feed-through is a coaxial connection.

6. The radar level gauge according to claim 1, wherein said single conductor probe is suspended by said electrical feed-through.

7. The radar level gauge according to claim 6, wherein said matching arrangement is a dielectric sleeve provided coaxially around an upper portion of the single conductor probe.

8. The radar level gauge according to claim 1, wherein said single conductor probe is made of a non-coated corrosion free steel wire.

9. The radar level gauge according to claim 1, wherein said transmit signal has a lower frequency limit less than 2 GHz.

10. The radar level gauge according to claim 1, wherein said transmit signal has an upper frequency limit less than 3 GHz.

11. The radar level gauge according to claim 1, wherein said transmit signal has a relative bandwidth less than two.

12. The radar level gauge according to claim 1, wherein an electromagnetic reflection from said electrically matched connection is weaker than an electromagnetic reflection caused by the surface.

13. The radar level gauge according to claim 1, wherein a reflection factor of said matched connection is less than −10 dB within said frequency range.

14. The radar level gauge according to claim 13, wherein said reflection factor is less than −15 dB within said frequency range.

15. A radar level gauging method for determining a distance to a surface of a product in a tank, comprising:
generating an electromagnetic transmit signal,
modulating a frequency of said transmit signal to vary within a frequency range having an upper frequency limit and a lower frequency limit, wherein said upper frequency limit is less than 4 GHz, said lower frequency limit is at least 1 GHz smaller than said upper frequency limit, and a ratio between said upper frequency limit and said lower frequency limit (relative bandwidth) is less than 2.5,
feeding said electromagnetic transmit signal though an electrical feed-through into said tank, and further into a single conductor probe extending into the product in the tank,
ensuring an electrically matched connection between a first input impedance of said electrical feed-through as seen from the single conductor probe and a second input impedance of said single conductor probe as seen from said electrical feed-through, said second input impedance being greater than said first input impedance,
guiding said electromagnetic transmit signal along said single conductor probe,
forming an electromagnetic return signal by allowing said electromagnetic transmit signal to be reflected in said surface,
guiding said electromagnetic return signal along said single conductor probe and back through said electrical feed-through,
receiving said electromagnetic return signal,
mixing said electromagnetic transmit signal and said electromagnetic return signal to provide an intermediate frequency signal, and
determining said distance based on said intermediate frequency signal.

16. The method according to claim 15, wherein said transmit signal has a lower frequency limit less than 2 GHz.

17. The method according to claim 15, wherein said transmit signal has an upper frequency limit less than 3 GHz.

18. The method according to claim 15, wherein said transmit signal has a relative bandwidth less than 2.

19. The method according to claim 15, wherein an electromagnetic reflection from said electrically matched connection is weaker than an electromagnetic reflection caused by the surface.

20. The method according to claim 15, wherein a reflection factor of said matched connection is less than −10 dB within said frequency range.

21. The method according to claim 20, wherein said reflection factor of said matched connection is less than −15 dB within said frequency range.

* * * * *

UNITED STATES PATENT AND TRADEMARK OFFICE
CERTIFICATE OF CORRECTION

PATENT NO. : 9,506,796 B2  
APPLICATION NO. : 14/511459  
DATED : November 29, 2016  
INVENTOR(S) : Olov Edvardsson Page 1 of 1

It is certified that error appears in the above-identified patent and that said Letters Patent is hereby corrected as shown below:

In the Specification

Column 12, Line 3, please change the "=" to a -- ≈ --

Signed and Sealed this  
Eleventh Day of July, 2017

Joseph Matal  
*Performing the Functions and Duties of the*  
*Under Secretary of Commerce for Intellectual Property and*  
*Director of the United States Patent and Trademark Office*